Figure 1:
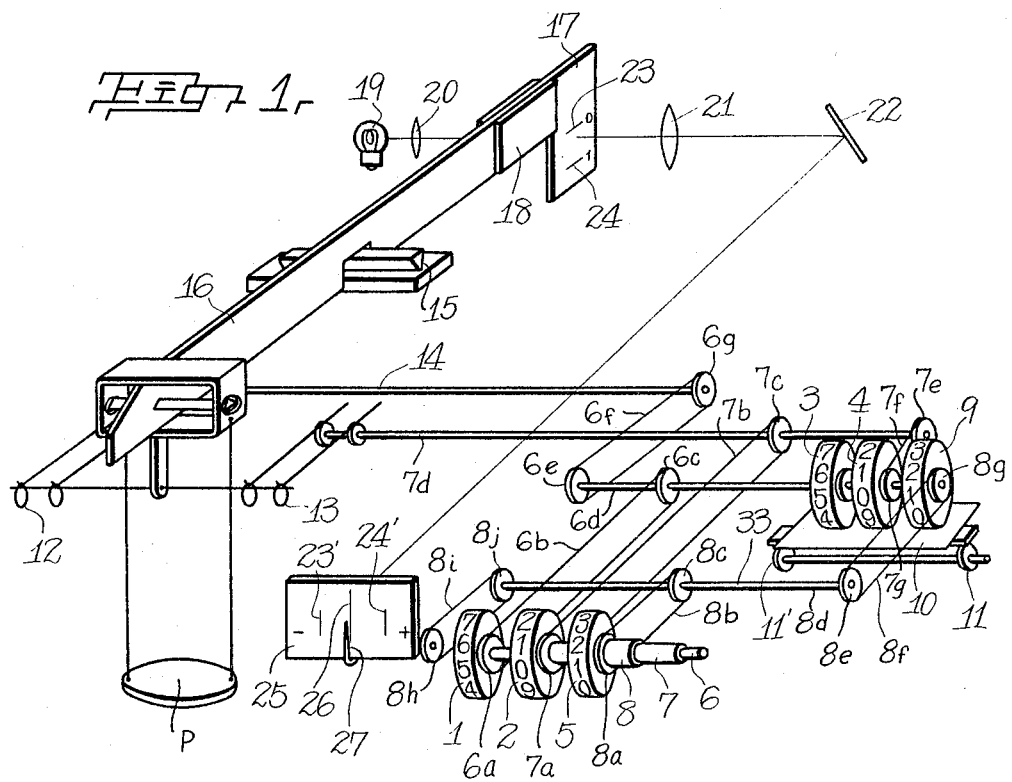

Dec. 13, 1966 HIDEO MISHIMA ETAL 3,291,235
DIGITAL INDICATING DEVICE FOR BALANCE
Filed Jan. 29, 1965

United States Patent Office  
3,291,235  
Patented Dec. 13, 1966

3,291,235  
DIGITAL INDICATING DEVICE FOR BALANCE  
Hideo Mishima and Nobuyuki Okamoto, Kyoto, Japan, assignors to Shimadzy Seisakusho Ltd., Kyoto, Japan, a corporation of Japan  
Filed Jan. 29, 1965, Ser. No. 429,962  
4 Claims. (Cl. 177—178)

This invention relates to balances for weighing operations and more particularly to an improved arrangement for more accurately reading balances of the digital indicator type and is a continuation-in-part application of application Serial No. 194,322, filed May 14, 1962, now abandoned.

In a weighing operation by means of a balance, two steps are involved. In the first step, coarse weighing takes place by using different combinations of weights having particular masses; in the second and fine weighing step one determines the fractional mass remaining and which will be less than the mass of the smallest weight available. The weight value of the fractional mass will be referred to hereinafter as the "fractional value." With recently constructed precision balances, this fine weighing step is performed by a pointer or a projection scale attached to the balance beam which is optically projected on a screen provided on the bed of the balance. There has been recently developed an operating device for weights wherein loading and unloading of the weights are performed by several groups of cams, rotation of the cam shafts being transmitted to a group of indicating wheels to develop a digital representation of the weight value obtained by operation of the weights. However, in this construction since the digital representation is made only for a value obtained by operation of the weights, and a fractional value obtained by a projection scale is left in analogue representation, it is at a disadvantage not only from the standpoint of production of a fully automatic balance but also because it does not eliminate personal errors.

Accordingly a primary object of the present invention is to provide an improved construction for precision balances and particularly an improved arrangement for affording more accurate reading of fractional values of the mass being weighed.

A more particular object is to provide a relatively simple device which is capable of carrying out digital representation of the fractional value of the mass without exerting any reaction on the balance beam.

A further object of the invention is to provide an improved digital indicating device for use with precision balances wherein a fractional value of the mass is established by use of the "zero" method which utilizes a signal feed-back system.

Still another object of the invention is to provide an improved digital indicating device for precision balances wherein a projection scale and digital indicating system is coordinated with an appended device for digital indication of a fractional value of the mass being weighed.

Figure 2:
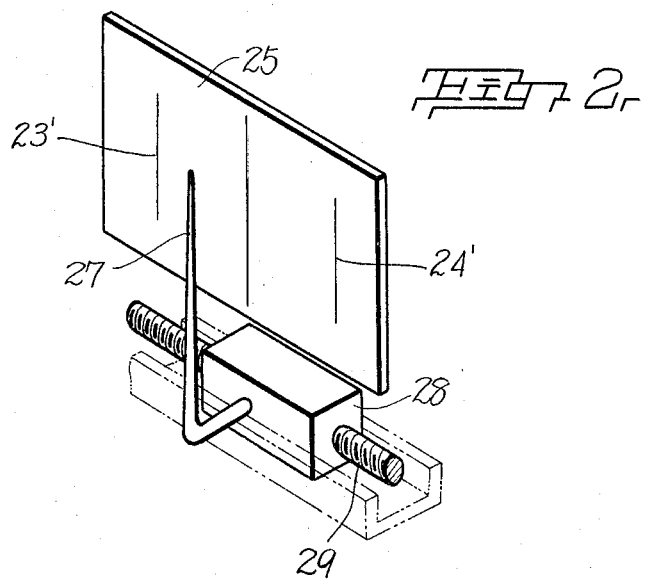

The foregoing objects and advantages of the invention will become more apparent from the following description of one suitable embodiment thereof and from the accompanying drawings in which:

FIG. 1 is a diagrammatic perspective view of an indicating device according to the invention; and FIG. 2 is a perspective view showing in more detail a part of the screen plate and associated pointer mechanism of the overall structure shown in FIG. 1.

With reference now to the drawings, the precision balance is one of the constant load type wherein the pan and weights receiver are both suspended on one side of the beam and the balance weight is attached to the opposite side of the beam. Numeral indicating wheels 1, 2 are provided to indicate two decimal figures, and if the capacity of the balance is 100 gr., the wheels 1 and 2 indicate a figure of a ten-gram unit and a figure of a one-gram unit, respectively.

Numeral printing wheels 3 and 4 are also provided corresponding to indicating wheels 1, 2 and these are used to print the two figures which are indicated by wheels 1 and 2. Indicating wheels 1 and 2 are manually rotatable respectively by means of concentric drive shafts 6 and 7 and to which the wheels are secured. For driving the printing wheels 3 and 4 in synchronism with the indicating wheels 1 and 2, non-slip cable-and-pulley drive mechanisms are utilized. Thus a pulley 6a on shaft 6 is connected by a cable 6b to a pulley 6c of the same diameter on shaft 6d to which printing wheel 3 is secured. To prevent any slip as between cable 6b and pulleys 6a, 6c, the cable is anchored to both pulleys and one or more turns of the cable is taken around each pulley dependent upon the overall rotational movement of the shaft which is to be transmitted by the cable. This detail has not been depicted in the drawings but is standard practice in the industry wherein a non-slip pulley and cable drive is desired.

In a similar manner, a pulley 7a on shaft 7 is connected by cable 7b to a pulley 7c of the same diameter on shaft 7d parallel with shaft 6d, there being a pulley 7e of the same diameter as pulley 7c secured to shaft 7d and which is coupled by a cable 7f to another pulley 7g also of the same size mounted concentrically with and secured to printing wheel 4 which is rotatively mounted on shaft 6d but not secured thereto. This pulley-and-cable drive is likewise made non-slip by the same means previously described.

For indicating the fractional value of the mass being weighed, and for printing this fractional value, a digital indicating wheel 5 is secured upon a shaft 8 which is mounted concentrically about the inner located shafts 6 and 7 and a printing wheel 9 is mounted on shaft 6d but not secured to the latter.

In order to transmit the rotation of wheel 5 and shaft 8 to printing wheel 9, still another non-slip cable-and-pulley drive is employed. This includes drive pulley 8a secured upon shaft 8, drive cable 8b and driven pulley 8c secured upon shaft 8d. Another pulley 8e secured to shaft 8d is connected by cable 8f to pulley 8g which is secured concentrically to fractional value printing wheel 9. Beneath the printing wheels 3, 4 and 9 is located a printing chart 10 which is caused to be pressed against the wheels 3 and 4 and 9 by means including a cam shaft 11 and spaced cams 11' which engage the undersurface of the chart.

The loading and unloading mechanism for the weights is conventional being of the cam and lever type, as disclosed in U.S. Patent No. 2,662,762, Meinig, granted December 15, 1953, there being included a group of weights 12 to determine the first digital figure indicated by wheel 1 and another group of weights 13 to determine the second digital figure indicated by wheel 2.

Associated with the group of weights 12 is a loading and unloading shaft 14 which is driven off shaft 6d by means of another non-slip cable-and-pulley drive, there being a pulley 6e secured to shaft 6d which is connected by cable 6f to pulley 6g secured upon shaft 14. Shaft 7d, previously mentioned, serves also for the purpose of loading and unloading the group of weights 13.

In operation, loading and unloading of weights 12 thus takes place by rotation of shaft 6 which also develops on the indicating wheel 1 and printing wheel 3 the corresponding digital value appertaining to this group of weights. Similarly, loading and unloading of weights 13 takes place by rotation of shaft 7 which also develops on the indicating wheel 2 and printing wheel 4 the corresponding digital value appertaining to this group of weights.

On one end of balance beam 16 which is on the opposite side of the fulcrum 15 from the sample receiving pan P are secured a transparent index plate 17 and a balance weight 18. A light beam from lamp 19 passes through a lens 20, index plate 17 and lens 21, and is reflected by a mirror 22. Two index lines 23, 24 are marked on index plate 17 and their magnified images 23', 24' are established on a screen plate 25 by the aforesaid light beam following reflection from mirror 22. The angle of inclination of the beam is magnified and indicated as a displacement of the image 23' from its original position. A pointer 27 is provided, as shown in FIG. 2, and is attached to traveling nut 28 which is threaded upon a feed screw 29. The latter is rotated by a pulley 8h connected by drive cable 8i to pulley 8j secured upon shaft 8d. Screen plate 25 is also provided with an index line 26.

When there is no sample on pan P, the distance between index line 26 and image 23' is equal to the distance between index line 26 and image 24', and by turning shaft 8 to obtain a state wherein pointer 27 coincides with image 23', indicating wheel 5 and printing wheel 9 will take a zero indicating angular position and a zero printing angular position respectively. To be able to move pointer 27 even in the weighing operation of a zero weight is important to maintaining acceptable accuracy on the balance.

The coarser steps in the weighing operation, by movement of the groups of weights 12, 13 is performed by turning shafts 6 and 7. When this initial phase of the weighing operation has been completed, the fine weighing operation to determine the fractional value of the mass being weighed is then begun. When weighing by the groups of weights 12, 13 has been completed, the beam 16 will have nearly reached a true state of equilibrium, i.e., it will come to rest at a small angle of inclination with respect to horizontal. Determination of the fractional value of the mass (the amount necessary to bring beam 16 to a state of balance in a horizontal plane) is then made by rotating shaft 8 which in turn is transmitted to feed screw 29 via 8b, 8c, 8d, 8j, 8i and 8h, the feed screw being rotated to shift the traveling nut 28 until pointer 27 carried by this nut coincides with image 23' which has shifted to the left and when this position has been reached both the indicating wheel 5 and printing wheel 9 for the fractional value will now express such value in a digital manner. Thus perfectly digital representation of a weight of a sample by the balance structure as explained is possible without causing any adverse effects on the beam.

We claim:

1. In a digital indicating device for a beam type balance, using a series of weights for balancing, the combination comprising a screen, an optical means projecting onto said screen images which are shifted in accordance with inclination of the beam element of said balance, an indicating wheel including on the periphery thereof a train of numerals for indicating respectively fractional values of the smallest weight used for beam balancing, a member movable with reference to said images produced on said screen, and transmitting means provided between said movable member and said indicating wheel for effecting rotation of said indicating wheel in accordance with the displacement of said movable member to show said fractional value digitally by one of said numerals.

2. A digital indicating device as defined in claim 1 for a beam type balance and which further includes a printing wheel including on the periphery thereof a train of numerals for also printing respectively in a digital manner the said fractional values of the smallest weight used for beam balancing, and means effecting rotation of said printing wheel by said transmitting means.

3. In a digital indicating device for a beam type balance using a series of weights for balancing, the combination comprising a lined index plate on said beam, a screen, an optical system for producing on said screen a magnified image of said index plate, a pointer arranged to move along said screen, means for moving said pointer, an indicating wheel including on the periphery thereof a train of numerals for indicating fractional values of the smallest weight used for beam balancing, and transmitting means provided between said pointer and indicating wheel for effecting rotation of said indicating wheel in accordance with the displacement of said pointer in relation to an image of an index line on said screen thereby to show said fractional value digitally by one of said numerals.

4. In a digital indicating device for a beam type balance, using a group of weights for balancing, the combination comprising a balance beam fulcrumed intermediate the ends thereof, a pan and weights receiver depending from one side of said balance beam, a balance weight attached to the other side of said balance beam, an operating shaft for loading and unloading said group of weights, a first rotatable indicating wheel actuated by said operating shaft and including on the periphery thereof a train of numerals for indicating in a digital manner the amount of the weights required to achieve near balance of said beam, a lined index plate attached to the side of said balance beam on the same side thereof as said balance weight, a screen, an optical system for producing on said screen a magnified image of said index plate, a pointer arranged to move along said screen, means for moving said pointer, a second indicating wheel including on the periphery thereof a train of numerals for indicating in a digital manner fractional values of the smallest weight unit included in the group of weights used for achieving said near balance of said beam and which is represented by one of the numerals on said first indicating wheel, and transmitting means provided between said pointer and second indicating wheel for effecting rotation thereof in accordance with displacement of said pointer in relation to an image of an index line produced on said screen thereby to show said fractional value digitally.

References Cited by the Examiner
UNITED STATES PATENTS

| | | | |
|---|---|---|---|
| 2,343,621 | 3/1944 | Williams | 177—178 X |
| 2,582,517 | 1/1952 | Williams | 177—178 |
| 3,053,143 | 9/1962 | Meier | 177—178 X |

RICHARD B. WILKINSON, *Primary Examiner*,

LOUIS J. CAPOZI, *Examiner*.

R. S. WARD, *Assistant Examiner*.